United States Patent [19]
Shaffer et al.

[11] 3,876,381
[45] Apr. 8, 1975

[54] IMPROVED EXFOLIATION TEST DEVICE

[75] Inventors: Irving S. Shaffer, Willow Grove; Rocco N. Ricci, Philadelphia, both of Pa.

[73] Assignee: The United States of America as represented by the Secretary of the Navy, Washington, D.C.

[22] Filed: Nov. 24, 1972

[21] Appl. No.: 309,023

[52] U.S. Cl. ............... 23/253 C; 23/230 C; 23/282
[51] Int. Cl. .......................................... G01n 17/00
[58] Field of Search ............. 23/230 C, 253 C, 282

[56] References Cited
UNITED STATES PATENTS
3,542,524   11/1970   Kimble et al. ..................... 23/282

OTHER PUBLICATIONS
The Corrosion Handbook, Uhling et al., Wiley & Sons, N.Y., (1948), pp. 42-43, 962-963.
Kirk-Othmer Encyclopedia of Chemical Technology, 2nd ed., Vol. 19, p. 410, (1969).

Primary Examiner—Joseph Scovronek
Assistant Examiner—Timothy W. Hagan
Attorney, Agent, or Firm—R. S. Sciascia; R. F. Beers

[57] ABSTRACT

An apparatus for performing exfoliation tests including a test device with sodium chloride in solution, means for immersion of pieces of aluminum to be tested and means for continually generating sulphur dioxide gas that inter-reacts with the surface of the sodium chloride solution, means for maintaining the temperature of the solution at a given level, and means for conducting away excess gas generated during the process.

6 Claims, 1 Drawing Figure

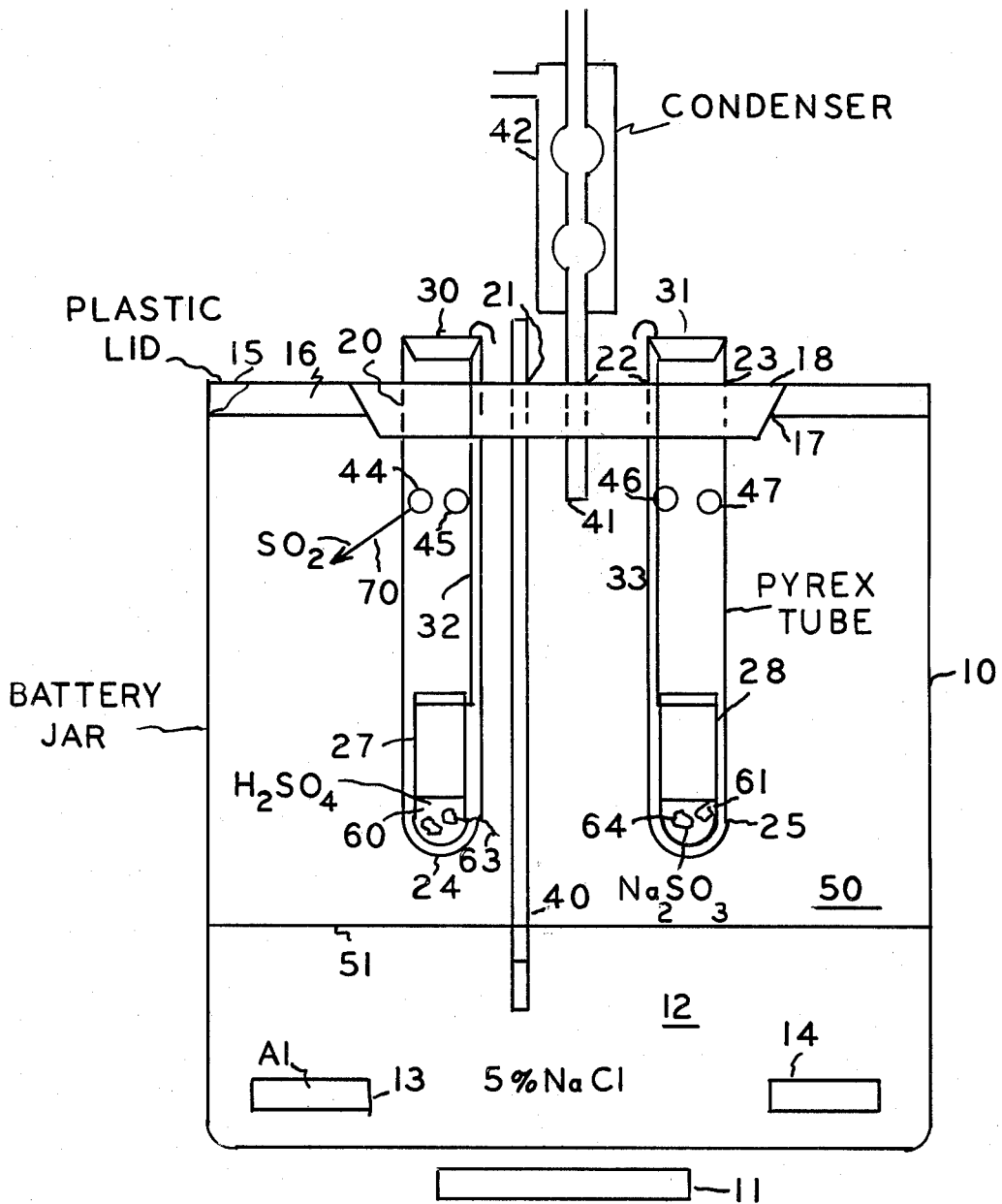

IMPROVED EXFOLIATION TEST DEVICE

The apparatus is uniquely designed to test aluminum samples under simulated conditions of aluminum used at sea such as that on aircraft subjected to salt spray and stack fumes aboard oil burning aircraft carriers.

The continuing problem of maintenance of Naval equipment under operating conditions necessitates continuing improvement of simulated tests of conditions so that devices may be designed which will have prolonged life.

Airplanes operating aboard carriers and in other areas are subjected to salt spray and in addition are subjected to sulphur dioxide due to contact with exhaust gases from oil or coal fired boilers. Chemically, the sulfur dioxide will inter-react with the sodium chloride in the liquid and cause inter-reaction with the aluminum of the airplane.

Since there are a variety of aluminum manufactureres, it is desirable to standardize test procedures so that military standards are met. There has been a program to develop standardized test equipment of improved quality and at the same time be of resonable cost.

It is therefore an object of this invention to provide an improved exfoliation test device.

It is yet a further object of this invention to provide an improved exfoliation test device for testing aluminum under simulated conditions experienced by airplanes aboard aircraft carriers by subjecting the aluminum to a liquid solution of sodium chloride with a sulphur dioxide atmosphere.

Still a further object of this invention is to provide an improved exfoliation test device for testing aluminum samples under pre-determined operating conditions comprising, a housing member having an open end; a closure member adapted to fit the open end and having a plurality of apertures extending therethru for receipt of the apparatus; a liquid of pre-determined chemical composition in the housing; means for placing samples to be tested in the liquid; holding member adapted to fit thru the apertures containing chemicals for production of specific gases; the holding members having a plurality of holes therein so that the gas may inter-act with the liquid in the volume defined between the lid and the liquid; and, means for heating the housing member to simulate desired testing conditions.

Still a further object of this invention is to provide an improved exfoliation test device wherein the liquid consists of a 5% solution of sodium chloride in water.

It is still a further object of this invention to provide an improved exfoliation test device wherein the chemical in the holding members is a combination of sulfuric acid and sodium sulfite.

And yet a further object of this invention is to provide an improved exfoliation test device wherein a temperature measuring device is coupled thru the lid into the liquid to automatically sense and regulate the temperature of the liquid.

It is still a further object of this invention to provide an improved exfoliation test device for simulating actual conditions comprising, means for generating sulfur dioxide gas in a controlled environment and allowing the gas to interreact with a sodium chloride solution of 5% concentration at a temperature of approximately 42° C for a period of 72 hours.

Other objects, advantages and novel features of the invention will become apparent from the following detailed description of the invention when considered in conjunction with the accompanying drawings wherein:

The FIGURE shows the standardized exfoliation test device.

Housing 10 in this instance, is a battery jar necessitated because of the chemical reaction conducted therein. The battery jar is above a heating element 11 which supplies the necessary heat to aid in simulating temperatures experienced in aircraft parked upon carriers in operating conditions. Within the battery jar is a liquid 12 which consists of about three liters of water and is a 5% solution of sodium chloride.

A plurality of aluminum samples are placed in the liquid and two such samples 13, 14 are shown.

The top 15 of the battery jar is closed by plastic lid 16 having a large aperture 17 in the top thereof. Rubber stopper 18 closes the aperture in lid 16 and has a plurality of apertures 20, 21, 22 and 23 to receive certain devices as follows. Pyrex tubes 24 and 25 are inserted in apertures 20, 23 and contained within the tubes are reaction tubes 27, 28. The reaction tubes are suspended within pyrex tubes 24, 25 which are sealed by plugs 30, 31.

The reaction tubes 27, 28 are suspended within pyrex tubes 24, 25 by nylon cords 32, 33 so that the chemical charge placed within the reaction tubes may be replenished from time to time when long timed tests are being conducted. There is additionally provided a thermometer 40 extending thru the rubber stopper 18 into liquid 12 and an intake 41 of a condenser 42. The thermometer 40 may be operatively connected to heater 11 through a controlling means (not shown) in a manner known in the art to sense and control the temperature of liquid 12. The tubes 24, 25 individually contain a series of perforations or holes 44, 45, 46 and 47 whose purpose is to allow gas generated within the reaction tube to escape into the volume 50 in battery jar 10. The volume 50 is defined between the upper surface 51 of liquid 12, plastic lid 16 and jar 10. These gases are generated thru the inter-reaction of sulfuric acid 60, 61 in the reaction tubes and sodium sulfite capsules 63, 64 in the sulfuric acid. The chemical reactions occurring are as follows.

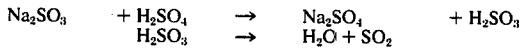

$$Na_2SO_3 + H_2SO_4 \rightarrow Na_2SO_4 + H_2SO_3$$
$$H_2SO_3 \rightarrow H_2O + SO_2$$

This reaction generates gas $SO_2$ shown escaping by arrow 70 into volume 50. This in turn will inter-react with sodium chloride in a way to produce chemical reaction with the aluminum.

In the successful test to develop simulated environment of an aircraft with sea spray and stack gases containing sulfur, the following preparations and format are used. The sodium chloride in the solution is at 5%, each reaction tube contained two capsules of sodium sulfite, (one capsule contained 1.4 ± 0.2 grams) which are mixed with not less than 8 ml of concentrated $H_2SO_4$. The test temperature was 42°± 2. The ratio of the solution volume to specimen surface area was 50–100 ml/in$^2$, test duration was 72 hours with the specimens tested in a horizontal position.

Obviously many modifications and variations of the present invention are possible in the light of the above teachings. It is therefore to be understood that within the scope of the appended claims the invention may be practiced otherwise than as specifically described.

We claim:

1. An improved exfoliation test apparatus for testing aluminum samples under predetermined operating conditioins comprising:
   a. a housing member having an open end;
   b. a closure member adapted to fit said open end and having a plurality of apertures extending therethru for receipt of portions of the apparatus;
   c. a liquid of predetermined chemical composition in said housing and in which aluminum samples are to be immersed;
   d. holding members adapted to fit thru said apertures containing chemicals for production of specific gases, said holding members having a plurality of holes therein above the level of said liquid so that said gases contact said liquid only at the interface between the volume defined between said lid and said liquid; and
   e. means for heating said housing member to simulate desired testing conditions.

2. An improved exfoliation test apparatus of claim 1 wherein said liquid consists of a 5% solution of sodium chloride in water.

3. An improved exfoliation test apparatus of claim 2 wherein said chemical in said holding members is a combination of sulfuric acid and sodium sulfite, said combination generating said sulphur dioxide gas.

4. An improved exfoliation test apparatus of claim 3 wherein a temperature measuring device is coupled thru said lid into said liquid to sense and regulate the temperature of said liquid by controlling said heating means.

5. An improved exfoliation test apparatus of claim 4 wherein there is provided a condenser to allow for escape of excess gases from said defined volume to retain the test apparatus as substantially atmospheric pressure.

6. An improved exfoliation test apparatus of claim 5 wherein there is provided means in said holding member to replenish the source of sulfur dioxide gas at predetermined intervals to retain the necessary chemical composition in contact with said aluminum samples.

* * * * *